Patented May 3, 1932

1,856,357

UNITED STATES PATENT OFFICE

ADOLPH PLACEK, OF NEW ORLEANS, LOUISIANA

UTILIZATION OF DISTILLERY SLOPS JOINTLY WITH WOOD SAWDUST OR OTHER VEGETABLE WASTE OR CARBONACEOUS MATERIALS

No Drawing. Original application filed December 28, 1928, Serial No. 329,079. Divided and this application filed January 27, 1931. Serial No. 511,654.

This invention aims to solve the economical problem of utilization of the distillery slops by combining their treatment with the treatment of such other materials and by means of such a common process which, by virtue of such a combination, will furnish valuable products in a far more economical and advantageous way than if they were treated separately.

This application is a division of my copending application Ser. No. 329,079, filed December 28, 1928.

This invention specifically relates to the method, by which a dried mixture of concentrated distillery slops from cane-sugar or beet-sugar molasses, or from other origin, and wood sawdust or other shredded vegetable residues, like bagasse, straw, hydrolyzed sawdust, lignin substances, or other carbonaceous matters, are utilized as a fuel, or as a raw material, which is subjected to the process of destructive distillation in view to obtain valuable by-products. My method may be employed in a more or less mechanically elaborate process without materially changing its object. It may be exemplified as follows:—

The distillery slops, which have been concentrated to a sirup, are mixed with wood sawdust (untreated or treated by extraction, hydrolysis, or otherwise), or with other above mentioned carbonaceous materials, in such proportions as to form a plastic mixture which, when compressed into briquettes or other suitable forms, is transformed by drying into solid, uniformly sized pieces of materials. This material is very suitable to be utilized as such as a fuel in common fireplaces, or in gas producers, or to be subjected to the destructive distillation process in the retorts. The products of this destructive distillation may be recovered in a similar way like in any wood distillation plant, whereby charcoal, combustible gas, and condensed liquor are recovered and treated for further utilization. By this method, besides the usual products of the destructive distillation of wood or of other involved carbonaceous materials, valuable products (derived mostly from the slops) are obtained, viz., a high amount of nitrogen compounds like ammonia, pyridine bases, methylamines, etc. The resulting charcoal may be utilized as a fuel, or it may be ground into powder from which the soluble constituents are removed by leaching with water. This leached powder, when mixed with some suitable binder, like starch, pitch, molasses, or other, is compressed into briquettes and dried. In this way, a high grade briquetted fuel, besides a solution of soluble salts, and especially potassium salts, is obtained.

The same result, however, may also be attained without the preliminary compression of the original mixture into briquettes. Thus the process may be simplified by preparing the mixture of the concentrated slops with the other involved materials in a loose state, which, on drying, gives a solid material in lump or granular form. This material is carbonized in the retorts, which may be designed for a discontinuous or a continuous process of destructive distillation, whereby the charcoal in lumps or in a granular form is obtained, which is then leached with water, compressed into briquettes with the use of a suitable binder and finally dried.

If the charcoal briquettes are not desired as a finished commercial product, the carbonization and combustion of the original dried briquetted mixture may be performed in one operation, by employing it directly as a fuel in a gas producer, with the provision of means to recover all valuable by-products, including ashes, rich in potassium and phosphorus. By this means, especially when the Mond's process is applied, a more thorough recovery of nitrogen compounds is also effected.

My method does not aim principally to use the concentrated distillery slops as a mere binder in agglomerating solid particles of vegetable or other carbonaceous materials, but to bring the slops into such a solid state and such a convenient form as to eliminate many difficulties in handling, involved in their utilization as a fuel, or in their destructive distillation, with the subsequent recovery of all possible by-products. I have found that a far larger amount of concentrated slops may be used than that necessary for the application as a mere binder in the briquetting of the above mentioned vegetable and carbonaceous materials. Thus, for example, the concentrated distillery slops from sugar-cane molasses may be advantageously mixed with wood sawdust within very broad limits, viz., in proportions (by weight) of the slops corresponding to 1 to 10 parts of original molasses used in the fermentation to 1 part of wood sawdust.

Another advantage of my method is that the destructive distillation of combined material, such as distillery slops and wood residues or other vegetable waste, furnishes a composition of condensible liquid which permits a more economic recovery of certain by-products. For example, the more economic recovery of methanol as a subsidiary by-product may be effected with the simultaneous recovery of ammonia and other nitrogen bases. This is especially true for the kinds of wood which, when subjected alone to a destructive distillation process, yield such a small percentage of methanol as would not justify its recovery.

I am aware that prior to my invention the distillery slops as well as the sawdust and other vegetable materials have been utilized separately as fuel and in the destructive distillation in view to recover all above mentioned by-products. I, therefore, do not claim such a process broadly, but what I claim as new and desire to secure by Letters Patent is:

The method of producing high grade charcoal fuel, consisting in preparing a mixture of the concentrated distillery slops with wood saw-dust, ground vegetable waste and other carbonaceous materials, drying, carbonizing and grinding residue into a powder, leaching from said powder water soluble constituents, mixing leached residue with a suitable combustible binder, compressing into briquets, and drying.

In testimony whereof, I affix my signature.

ADOLPH PLACEK.